May 23, 1950 K. POSTHUMUS 2,508,538
MULTIPLES PULSE DISTRIBUTING SYSTEM
Filed Nov. 22, 1946
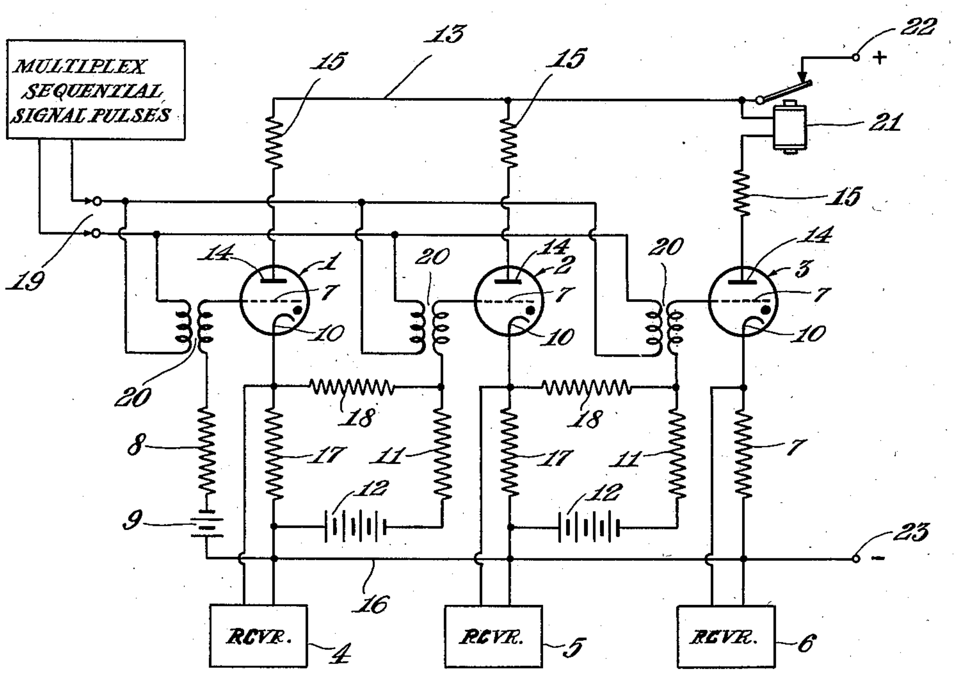
KLAAS POSTHUMUS
INVENTOR.
BY [signature]
ATTORNEY.

Patented May 23, 1950 2,508,538

UNITED STATES PATENT OFFICE 2,508,538

MULTIPLES PULSE DISTRIBUTING SYSTEM

Klaas Posthumus, Eindhoven, Netherlands, assignor to Hartford National Bank and Trust Company, Hartford, Conn., as trustee Application November 22, 1946, Serial No. 711,691
In the Netherlands October 13, 1945

Section 1, Public Law 690, August 8, 1946
Patent expires October 13, 1965

4 Claims. (Cl. 179—15)

In telephony and television or image telegraphy by means of pulse modulation, both by radio means and by means of a transmission line, it is possible for a plurality of different signals to be transmitted simultaneously through one channel and to be applied individually to a desired utilization device (multiplex pulse modulation). This may be effected by arranging for the pulses of the signals to be transmitted through the same channel to be passed alternately and in each instance in the same sequence. In this case an arrangement is required at the receiving end by which the signal fragments are distributed to the receiving devices intended for them. The invention concerns an arrangement of this kind for distributing pulses to receivers arranged for reception of pulses whose leading- or trailing-edge or both vary in phase with respect to time and wherein the amplitude of the signal produced is proportional to the time at which said edges of the pulse appear in the interval to it.

The arrangement, according to the invention, comprises a number of interconnected grid controlled gaseous discharge tubes, one such tube being required for each signal channel desired, the circuits of which are each connected to a separate receiving device in such manner that the latter is made operative owing to breakdown of the associated gaseous discharge tube. The grid potential of the tubes with respect to the cathode is so low that the tubes do not draw current and, except the first, do not breakdown even upon an increase in potential by an amount equal to the pulses to be distributed. The grid of each subsequent tube is connected to the circuit of the preceding tube in such manner that upon breakdown of the latter it acquires an increased potential and thus also breaks down upon further increase by the pulse voltage.

If in this arrangement the whole sequence of the pulses to be distributed is applied to the grids of the gaseous discharge tubes, the first tube will breakdown upon receiving the first-arriving pulse. This breakdown results in the receiving device connected to the first tube being made operative. The receiving device reacts on the breakdown of the tube in the same manner in which it would react on the first signal pulse in the case of direct control and consequently reproduces the signal constituent to be transmitted by the said pulse.

Owing to the fact that upon breakdown of the first tube the second tube coupled with it acquires an increased grid voltage (that is to say a less negative grid voltage), it breaks down upon reception of the next succeeding pulse. At this moment it switches on the receiving device connected thereto and also raises the grid voltage of the third tube which, in its turn, breaks down at the moment when the third pulse arrives, etc. Consequently with each subsequent pulse another receiver is switched on.

The mutual coupling of the grid controlled gaseous discharge tubes may be obtained as follows: The grid of each subsequent tube is connected, by a resistor, to the cathode of the preceding tube and through a second resistor having a high value with respect to the first-mentioned resistor and a source of negative grid-voltage, to a negative current supply conductor which is common to the two tubes and which is connected, by resistors, to the cathodes of the two tubes.

The voltage variations required for operating the receiving devices may be derived from the last-mentioned resistors.

When a complete series of pulses have been received, all the tubes are ignited. Now, the first receiver must react again on the subsequent pulse. This is not possible so long as the tube connected to this receiver still draws current. Consequently, this current as well as that of the other tubes must be interrupted. For this purpose, the arrangement comprises means by which the tubes, after all of them have been ignited, are extinguished, for example by interruption of the anode voltage of the tubes for a short period of time. The circuit of the last tube may include, for example, a quick-acting relay which interrupts the anode voltage for a moment under the action of the current flowing in the circuit. It is also possible for the control of such a relay to utilise synchronising pulses which are supplied after completion of each full series of signal pulses.

The invention will be set out more fully by reference to the accompanying drawing showing a schematic diagram of an example of the arrangement according to the invention.

This executional example shows three grid controlled gaseous discharge tubes 1, 2 and 3. Consequently, the device is adapted for three signals transmitted simultaneously but, if this number is larger, it may be extended by adding a corresponding number of tubes and associated tube circuits. Three receiving devices designated 4, 5 and 6 respectively are connected to the circuits of tubes 1, 2 and 3 respectively.

The grid 7 of tube 1 is connected to the cathode 10 by a resistor 8 and a source 9 of negative grid-bias. Similarly, the grid of tube 2 is connected to the cathode 10 of tube 2 by a resistor 11 and a source 12 of negative grid-bias. The grid of the third tube is similarly connected to the cathode 10 of tube 3 by a resistor 11 and a source of negative grid-bias 12.

The grid controlled gaseous discharge tubes have a common positive current supply conductor 13, by means of which the anodes 14 are connected through damping resistors 15, and a common negative current supply conductor 16 by means of which the cathodes 10 are connected by coupling resistors. The receivers 4, 5 and 6 are connected by means of the last-mentioned resistors.

The grid of tube 2 is connected to the cathode of tube 1 by means of a resistor 18. Similarly, the grid of the tube 3 is connected by a resistor 18 to the cathode of tube 2.

The signal voltages to be distributed are supplied to the terminals 19 and transferred to the grid circuits of the tubes by means of transformers 20 so that the pulse voltages add to the voltages supplied by the sources 9 and 12.

When, now, the first pulse arrives, the tubes 2 and 3 do not react to it, since the pulse voltage cannot neutralise the voltage of the source 12. The grids of these tubes remain negative and hence the tubes 2 and 3 do not draw. The situation is different, however, for tube 1. The voltage of source 9 is so small as to be exceeded by the pulse voltage. Consequently, the grid 7 of tube 1 is rendered positive for a moment and tube 1 breaks down. In this case a current flows through the resistor 17, which connects the cathode of tube 1 to the conductor 16, and a voltage difference arises between the ends of the said resistor. This results in the receiving device 4 receiving at the same moment a pulse and thus reproducing a signal constituent. The amplitude of this signal is dependent on the moment at which the first pulse occurs within the interval intended for it i. e., receiver 4 comprises a frequency or phase responsive element and the amplitude of the signal generated thereby is a function of the instance to which the first pulse which actuates tube 1 occurs. In this respect the receiver 4 conforms to standard practice for demodulating an impulse whose phase position varies with time. The grid controlled gaseous discharge tube, once ignited, continues to draw current.

The grid of tube 2, the voltage of which is initially determined only by that of the source of supply 12, undergoes an increase in voltage owing to the fact that a voltage which has a tendency to make said grid positive is present across resistor 17 of tube 1. By correct proportioning of the resistances or resistors 11 and 18 and a suitable value of the resistor 17 the grid voltage of the tube 4 may thus equal the initial voltage of the tube 1, so that with the subsequent pulse, which adds to this voltage in the grid circuit, tube 2 also breaks down. For this purpose the resistor 11 must have a high value with respect to the resistance of resistor 18. A suitable value for resistor 11 is, for example, $10^6$ ohms. The value of resistor 18 may then amount to $10^5$ ohms. The resistor 17 may be smaller and for this 1000 ohms is a suitable value.

When tube 2 also breaks down, current flows through the resistor 17 which connects the cathode of tube 2 to the conductor 16 and a voltage drop occurs across resistor 17 which makes the receiver 5 respond and raises the grid potential of tube 3. Consequently, with the increased voltage due to the third pulse tube 3 also is ignited.

At this point all the tubes are ignited and a subsequent pulse, which is intended for the receiver 4, would produce no effect if the situation remained unchanged. Consequently, the positive supply conductor 13 includes a relay 21 having its actuating winding connected in the anode circuit of tube 3 to open supply conductor 13 upon ignition of tube 3. It is understood that relay 21 also may have supplied to it the synchronising signals transmitted after completion of each full series of signal voltages. Under the action of these synchronising signals the relay 21 causes a short interruption of the supply of current. In the meantime the grids of all of the tubes are negative again, for they were at a positive voltage only during the very short presence of the pulses, so that this interruption prevents the tube from drawing current until a new pulse causes ignition of tube 1 again. Instead of interruption of the current supplied by a supply device to the tubes 1, 2 and 3 via the terminals 22 and 23, it is also possible to discontinue the current flowing through the tubes by short-circuiting them.

What I claim is:

1. In a multiplex communication circuit arrangement for distributing a plurality of pulses cyclically transmitted in a given sequence to a plurality of receiving devices to be actuated in said sequence in response to said pulses, each pulse in said sequence being derived from an intelligence signal conveyed by a distinct transmission channel and having a time position depending on the instantaneous amplitude of said signal, a first and a second gaseous discharge tube, each of said gaseous discharge tubes having an anode, a control grid and a cathode, first and second of receiving devices to be actuated in said sequence, each device producing a voltage whose amplitude depends on the time of actuation, means to couple each of said devices to one of said tubes to be actuated by the ignition of said tube, means to bias the control grid of said first gaseous discharge tube to a cut-off value, means to bias the control grid of said second gaseous discharge tube to a value greater than the sum of the cut-off bias of said second tube and the amplitude of said pulses, means responsive to current flow in said first tube to reduce the potential applied to the grid of said second tube, and means to couple said pulses to the control grids of said first and second discharge tubes.

2. In a multiplex communication circuit arrangement for distributing a plurality of pulses cyclically transmitted in a given sequence to a plurality of receiving devices to be actuated in said sequence in response to said pulses, each pulse in said sequence being derived from an intelligence signal conveyed by a distinct transmission channel and having a time position depending on the instantaneous amplitude of said signal, the combination comprising in succession a first, an intermediate and a final gaseous discharge tube, each of said gaseous discharge tubes having an anode, a control grid and a cathode, three receiving devices to be actuated in said sequence, each device producing a voltage whose amplitude depends on the time of actuation, means to couple each of said devices to one of said tubes to be actuated by the ignition of said tube, means to bias the control grid of said first gaseous discharge tube to a cut-off value, means to bias the control grid of said intermediate gaseous discharge tube to a value greater than the sum of the cut-off bias of said intermediate tube and the amplitude of said pulses, means to bias the control grid of said final gaseous discharge tube to a value greater than the sum of the cut-off bias of said final tube and the amplitude of said pulses, means responsive to current flow in said first tube to reduce the potential applied to the grid of said intermediate tube, means responsive to current flow in said intermediate tube to reduce the potential applied to the grid of said final tube, and means to couple said pulses in parallel to the control grids of said succession of gaseous discharge tubes.

3. A circuit arrangement for distributing a plurality of pulses cyclically transmitted in a given sequence to a plurality of receivers to be operated in sequence in response to said pulses, comprising in succession a first, an intermediate and a final gaseous discharge tube, each of said gaseous discharge tubes having an anode, a control grid and a cathode, means to apply a direct current potential between the anode and the cathode of each of said tubes, a resistor interposed between the positive pole of said potential means and the anode of each of said tubes, a second resistor interposed between the negative pole of said potential means and the cathode of each of said tubes, a plurality of receivers to be operated in said sequence, each of said receivers being coupled across the cathode resistor of one of said tubes and being actuated by the ignition of said tube, means to bias the control grid of said first gaseous discharge tube to a cut-off value, means to bias the control grid of said intermediate discharge tube to a value greater than the sum of the cut-off bias of said intermediate discharge tube and the amplitude of said pulses, means to bias the control grid of said final discharge tube to a value greater than the sum of the cut-off bias of said final tube and the amplitude of said pulses, a plurality of transformers, the secondary windings of said transformers being interposed in the grid circuit of said discharge tubes and the primary windings being connected in parallel to couple said pulses to the control grids of said discharge tubes, a grid resistor interposed between the grid biasing means and the transformer secondary winding of the grid circuit of each of said tubes, a third resistor coupling the cathode of said first discharge tube to the junction of the grid resistor and the transformer secondary winding of said intermediate discharge tube, a fourth resistor coupling the cathode of said intermediate discharge tube to the junction of the grid resistor and the transformer secondary winding of said final discharge tube, and a relay, the actuating winding of said relay being interposed in the anode circuit of said final tube and the contact elements of said relay being interposed in the direct current application means to interrupt the supply of direct current potential in response to current flow in said final discharge tube.

4. An arrangement, as set forth in claim 2, further including means responsive to current flow in said final tube to extinguish simultaneously all of said gaseous tubes.

KLAAS POSTHUMUS.

REFERENCES CITED

The following references are of record in the file of this patent:

UNITED STATES PATENTS

| Number | Name | Date |
|---|---|---|
| 2,282,046 | Goldsmith | May 5, 1942 |
| 2,310,105 | Michel | Feb. 2, 1943 |
| 2,373,134 | Massonneau | Apr. 10, 1945 |
| 2,402,372 | Compton | June 18, 1946 |
| 2,412,642 | Wilkerson | Dec. 17, 1946 |